United States Patent [19]

Cornwell et al.

[11] 4,455,512

[45] Jun. 19, 1984

[54] SYSTEM FOR LINEAR MOTOR CONTROL

[75] Inventors: William J. Cornwell, Saratoga; Tex M. Dudley, Palo Alto; William H. Lee, Los Altos Hills, all of Calif.

[73] Assignee: General Signal Corporation, Stamford, Conn.

[21] Appl. No.: 371,426

[22] Filed: Apr. 23, 1982

[51] Int. Cl.³ ............... G05B 19/40; G05B 1/01
[52] U.S. Cl. .................. 318/135; 318/38; 318/687; 318/571; 318/640; 310/12; 310/13
[58] Field of Search ............ 318/38, 135, 687, 640, 318/571, 573, 599, 701, 696; 310/12, 13

[56] References Cited

U.S. PATENT DOCUMENTS

| 3,735,231 | 5/1973 | Sawyer | 318/687 |
|---|---|---|---|
| 3,836,835 | 9/1974 | Sawyer | 318/135 X |
| 3,851,196 | 11/1974 | Hinds | 310/12 |
| 3,857,078 | 12/1974 | Sawyer | 318/135 X |
| 3,878,411 | 4/1975 | Nocito et al. | 318/38 X |
| 4,009,428 | 2/1977 | Sawyer | 318/571 |

Primary Examiner—B. Dobeck
Assistant Examiner—Paul Shik Luen
Attorney, Agent, or Firm—Ellsworth R. Roston; Charles H. Schwartz

[57] ABSTRACT

Movable (a head) and stationary (a stator) members are disposed in contiguous relationship. First magnetizable and non-magnetizable zones are alternately disposed on the stator in a particular direction. Second magnetizable and non-magnetizable zones are alternately disposed on the head in the particular direction. The zones on the head and the stator face each other and have substantially equal spacings. First means are associated with the head for producing magnetic fluxes in the magnetizable zones in the head and stator in a particular pattern to obtain incremental relative movements between the head and the stator on a vectorial basis in the particular direction. Second means are associated with the head for compensating for hysteresis effects in the magnetizable zones in the head and stator. The second means may produce magnetic flux of alternating polarity and decaying amplitude near the end of each incremental movement of the head relative to the stator. Means are provided for indicating the position of the head relative to the stator in the particular direction at each instant. Means are included for obtaining the production by the first means of magnetic fluxes at each position to provide corrections in the incremental movement of the head relative to the stator in the particular direction at that position.

20 Claims, 5 Drawing Figures

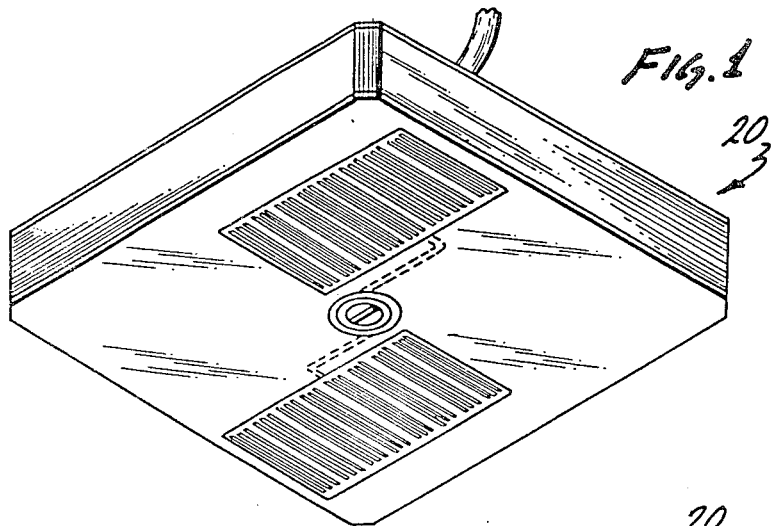
*FIG. 1*
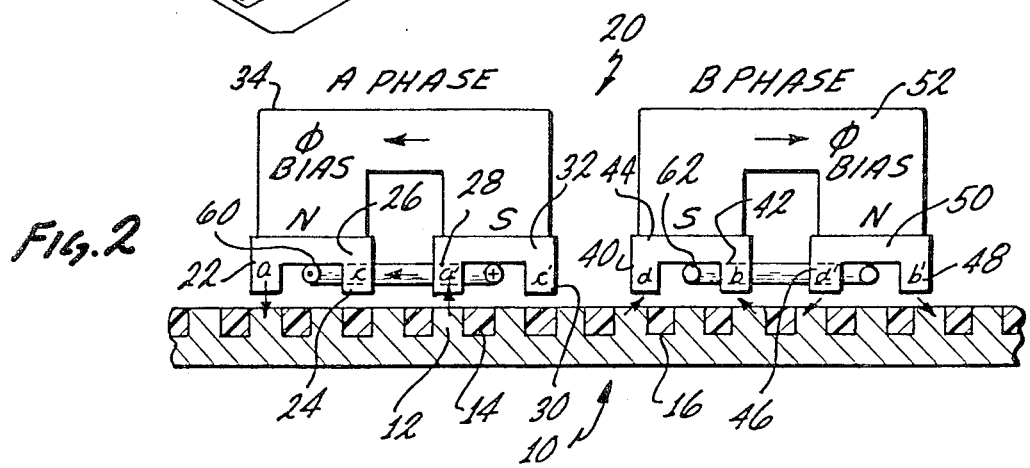
*FIG. 2*
*FIG. 5*

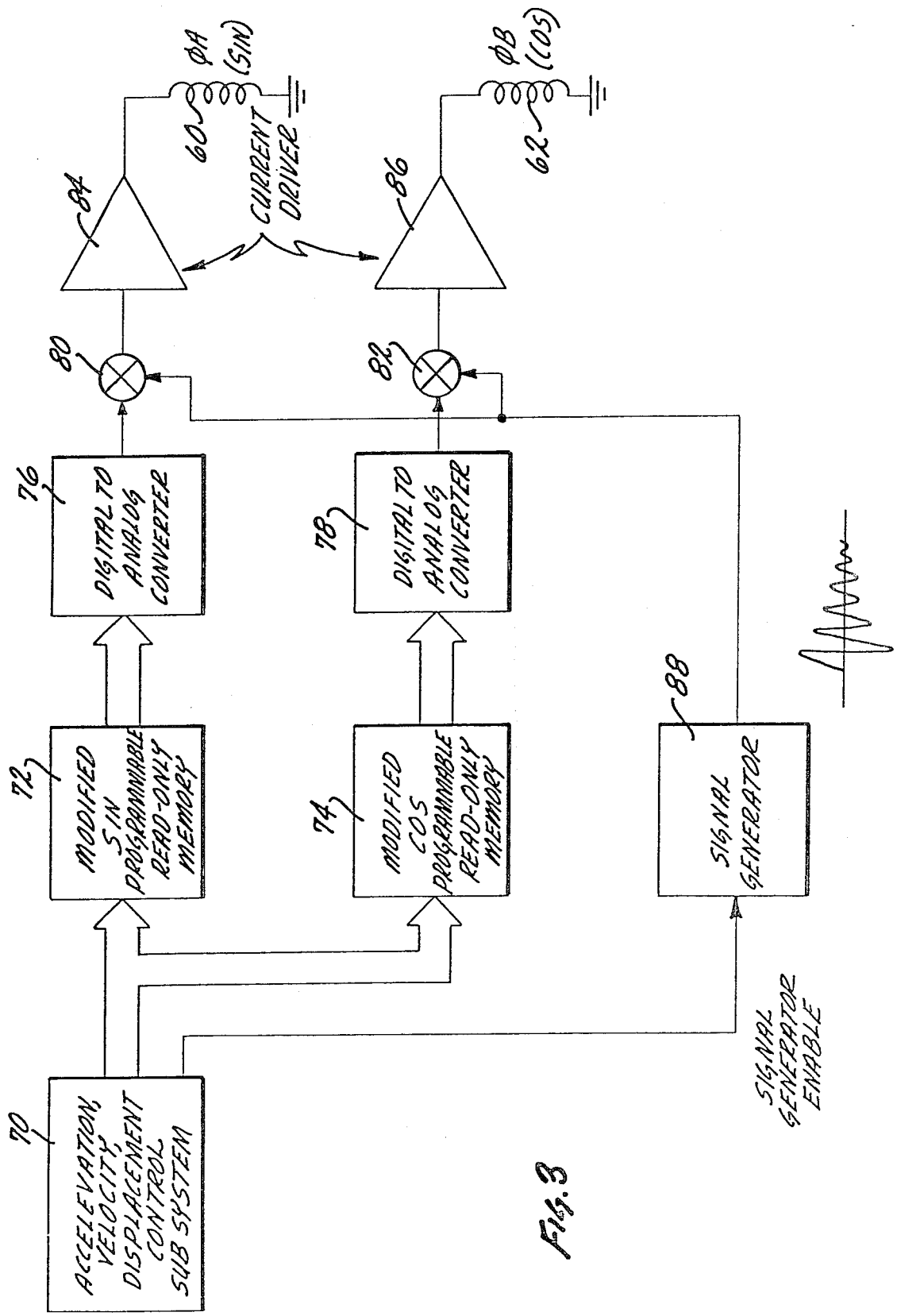

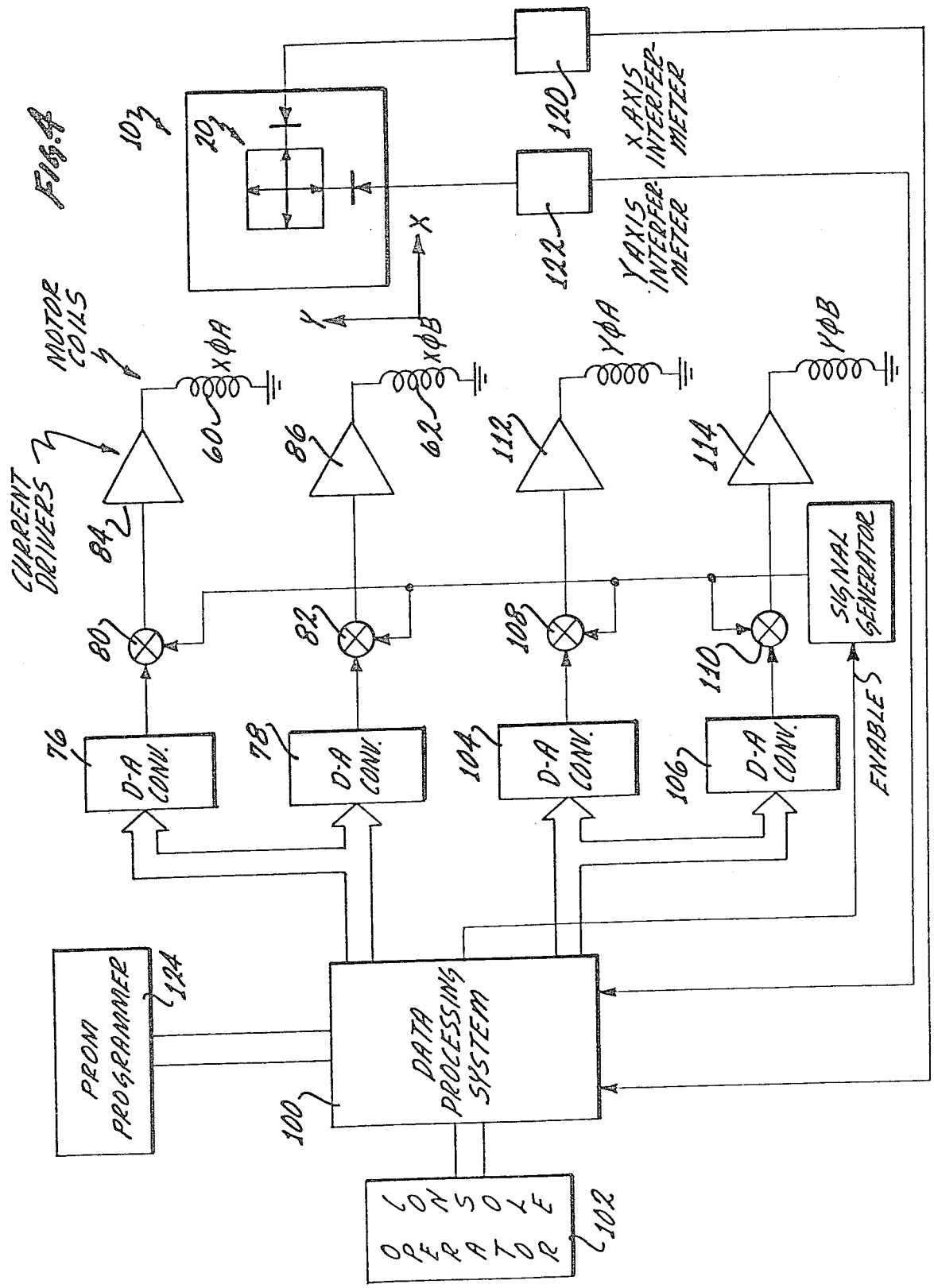

SYSTEM FOR LINEAR MOTOR CONTROL

This invention relates to motors and more particularly to motors for precisely positioning a movable member relative to a stationary member in accordance with instructions to the motor. The invention more particularly relates to a motor employing magnetic principles for obtaining an operation of the motor and for correcting for the effects of hysteresis and relatively minor inaccuracies in the construction of such motor.

Motors are now in use for operating at high speeds to provide a precise positioning at each instant of a motor member such as a head relative to a stationary member such as a stator. In this type of motor, the head and the stator include magnetizable and non-magnetizable zones which are disposed in contiguous relationship to each other. The magnetizable and non-magnetizable zones on the head are disposed in a first direction in alternate relationship as are the magnetizable and non-magnetizable zones on the stator. The magnetizable zones on the head and on the stator have substantially equal spacings.

In the motors now in use, the magnetizable and non-magnetizable zones on the head are disposed on poles which are paired relative to each other. The poles in each pair are spaced effectively 180° from each other, corresponding to the width of each zone. The poles in each pair are spaced 90° from the poles in the other pair. An individual pair of windings is provided, each associated with a different pair of poles. The windings are energized by alternating signals having a 90° phase displacement relative to each other.

The motors now in use also include systems having four (4) phases. The phases are paired with the phases in each pair being displaced by 180° from the other phase in the pair. The phases in each pair are displaced by 90° and 270° from the phases in the other pair. Such system is disclosed and claimed in U.S. Pat. No. 3,878,411 issued to Bernabe Nocito and Clifford R. Frohmberg on Apr. 15, 1975, for a "Compensating Positioning System."

When the windings are energized by the alternating signals, they cause magnetic fluxes to be produced in the head and the stator. These fluxes produce a movement of the head relative to the stator in the particular direction. The vector of this movement in the particular direction is dependent upon whether the alternating signals in one of the windings leads or lags the signals in the other winding by 90°. In each cycle of the alternating signals, the head moves relative to the stator through a distance corresponding to the combined width of a magnetizable zone and a non-magnetizable zone.

Even though the movements of the head relative to the stator are accurately controlled in accordance with the alternating signals introduced to the windings, errors in such movement still occur. For example, errors have been discovered to occur as a result of the hysteresis losses in the magnetizable zones. Such hysteresis losses cause a residual magnetism to exist in the magnetizable zones after the movement of the head relative to the stator through these magnetizable zones. These residual magnetic effects cause the positioning of the magnetic member to be slightly different during movement of the magnetic member along one vector in the particular direction than along the opposite vector in the particular direction even though the head has actually been instructed to be at the same position during the movements along the opposite vectors.

Slight errors in positioning of the head relative to the stator also result from an accumulation of different errors, all of them small. For example, not all of the magnetic and non-magnetic zones are provided with precise dimensions such as precise widths in the particular direction. Errors may also result from non-linearities in the magnetic circuit and from saturation effects in the magnetic circuit. All of these non-linearities cause the actual positioning of the head relative to the stator at each instant to vary from the desired positioning.

As positioning systems have become increasingly sophisticated, it has become correspondingly desirable to increase the accuracy of the positioning at each instant of the head relative to the stator. Accordingly, a considerable effort has been made to increase the accuracy of such movements of the head. In spite of such efforts, progress has been difficult in providing increased accuracies in the movement of the head relative to the stator.

This invention appreciates the difficulties discussed above and provides improvements for overcoming these difficulties. The invention includes movable (a head) and stationary (a stator) members disposed in contiguous relationship. First magentizable and non-magnetizable zones are alternately disposed on the head in a particular direction. Second magnetizable and non-magnetizable zones are also disposed on the stator in the particular direction. The zones on the head and stator face each other and have substantially equal spacings.

First means are associated with the head for producing magnetic fluxes in the magnetizable zones in the head and the stator in a particular pattern to obtain incremental relative movements between the head and the stator on a vectorial basis in the particular direction. Second means are associated with the head for compensating for hysteresis effects in the magnetizable zones in the head and the stator. The second means may produce magnetic flux of alternating polarity and decaying amplitude near the end of each incremental movement of the head member relative to the stator in the particular direction.

Means are provided for indicating the position of the head relative to the stator in the particular direction at each instant. Means are also included for obtaining the production by the first means of variable magnetic fluxes at each position in the particular direction to provide corrections in the incremental movements of the head relative to the stator in the particular direction at that position.

In the drawings:

FIG. 1 is a perspective view of a movable member such as a head in one embodiment of the invention;

FIG. 2 is a schematic sectional view of the head and a stationary member such as a stator disposed in contiguous relationship to the head;

FIG. 3 is a schematic plan view of the head and the stator and also shows electrical circuitry in block form for providing certain corrections in the positioning of the head relative to the stator in a particular direction;

FIG. 4 is also a schematic plan view of the head and the stator and also shows electrical circuitry in block form for measuring and recording the correction to be made by the system of FIG. 4 for each individual positioning of the movable member such as the head relative to the stationary member such as the stator; and FIG. 5 illustrates waveforms showing the errors to be corrected by the circuitry shown in FIG. 4.

In the embodiment of the invention shown in the drawings, a stationary member (a stator) generally indicated at 10 is shown as being in a planar configuration. However, the stator may be in any other suitable configuration such as in an annular configuration. The stator 10 is provided with a grid of magnetizable portions or zones 12 and nonmagnetizable portions or zones 14. The magnetizable portions or zones 12 and non-magnetizable portions or zones 14 are provided with equal (or substantially equal) widths in a particular direction and are alternately disposed.

The non-magnetizable portions 14 may be formed from cavities in a ferrous member between the magnetizable portions 12. The cavities may be filled with a non-magnetizable material 16. Although the grid formed from the magnetizable portions 12 and the non-magnetizable portions 14 is shown as extending in only the particular direction, it will be appreciated that a similar grid can be provided in a second direction defining a coordinate axis with the particular direction.

A head generally indicated at 20 is disposed in contiguous relationship to the stator 10 for movement in the particular direction relative to the stator. The head 20 may include a first pair of poles 22 and 24 at the opposite ends of a pole piece 26 and a second pair of poles 28 and 30 at the opposite ends of a pole piece 32. The pole pieces 26 and 32 are included in a first magnetic circuit including a permanent magnet 34. The poles 22 and 28 (which may be considered as magnetizable zones) are disposed in the same phase relationship and are disposed in the opposite phase relationship to the poles 24 and 30, which are in the same phase relationship to each other. In other words, the poles 22 and 28 are effectively spaced from the poles 24 and 30 by a distance equal to the width of each of the magnetizable zones 12 and the non-magnetizable zones 14. The poles 22, 24, 28 and 30 may be considered as magnetizable zones having the same width as the magnetizable zones 12 and non-magnetizable zones 14. Although the permanent magnet 34 is preferably used, it will be appreciated that permanent magnets do not have to be used. For example, the permanent magnets can be replaced by magnetizable poles and windings magnetically energizing the poles.

The head 20 also includes a pair of poles 40 and 42 at the opposite ends of a pole piece 44 and further includes a pair of poles 46 and 48 at the opposite ends of a pole piece 50. The pole pieces 44 and 50 are included with a permanent magnet 52 in a magnetic circuit. The poles 40 and 42 have the same relative spacing to the poles 46 and 48 as described above for the poles 22, 24, 28 and 30. The poles 40 and 46 are effectively displaced by a distance of 90° from the poles 22 and 28 in a first direction and the poles 42 and 48 are displaced by 90° in an opposite direction from the poles 22 and 28. A displacement of 90° corresponds to a distance of one half the width of each magnetizable zone 12 and each non-magnetizable zone 14 on the stator. The poles 40, 42, 46 and 48 may also be considered as magnetizable zones.

Windings 60 and 62 are respectively wound on the pole pieces 26 and 32 and the pole pieces 44 and 50. The windings 60 and 62 respectively receive alternating signals preferably having a sinusoidal waveshape. The alternating signals introduced to the windings 60 and 62 have an electrical phase difference of 90°.

In the positioning of the head 20 as shown in the drawings, the magnet 34 produces a magnetic flux which passes through a magnetic circuit including the magnet, the pole piece 26, the magnetizable zones 12, the stator 10 and the pole piece 28. When current flows through the winding 60, it produces a magnetic flux which aids the magnetic flux in one of the poles 22 and 28 and opposes the magnetic flux in the other one of the poles. However, even though the magnetic fluxes in the poles 22 and 28 are now unequal, no force is produced to move the head relative to the stator. This results from the fact that the poles 22 and 28 are disposed directly above the magnetizable zones in the stator 10 and the poles 24 and 30 are disposed directly above the non-magnetizable zones in the stator.

The magnet 52 produces magnetic flux which passes through a magnetic circuit including the magnet, the pole piece 44, the magnetizable zones 12, the stator 10 and the pole piece 50. When current flows through the winding 62, it causes the magnetic flux in one of the poles in each pair to be reinforced and the magnetic flux in the other pole in each pair to be opposed. For example, the current through the winding 62 may have a polarity to aid the flux in the poles 40 and 46 and oppose the flux in the poles 42 and 48. This causes the head to move to the left in FIG. 2 so that the reluctance of the magnetic path will be minimized. The head 20 will then be in a position where the current in the winding 60 will produce an incremental movement of the head toward the left in FIG. 2.

When the current in the winding 62 has an opposite polarity from that discussed above, it causes a magnetic flux to be produced which reinforces the flux in the poles 42 and 48 and opposes the flux in the poles 40 and 46. This causes the head to move to the right in FIG. 2 toward a position in which the reluctance of the magnetic circuit is minimized. The head then becomes positioned so that the current through the winding 60 produces flux which acts upon the flux in the poles 22, 24, 28 and 30 to continue the movement of the head 20 to the right in FIG. 2.

Actually, the movement of the head 20 relative to the stator 10 can be provided on a continuous basis by introducing to the windings 60 and 62 signals having a bipolar periodic waveform such as a substantially sinusoidal waveform. The direction of this movement is dependent upon whether the current in the winding 60 leads or lags the current in the winding 62 by 90°. The speed of this movement is dependent upon the frequency of the alternating signals introduced to the windings 60 and 62. In any case, in each cycle of the signals introduced to the windings 60 and 62, the head traverses a distance relative to the stator corresponding to the combined widths of one of the magnetizable zones 12 and one of the non-magnetizable zones 14.

The stator 12 and the head 20 may be constructed in a manner such as disclosed and claimed in U.S. Pat. No. Re. 27,289 issued to Bruce A. Sawyer on Feb. 15, 1972, for a "Magnetic Positioning Device" or in U.S. Pat. No. 3,878,411 issued to Bernabe Nocito and Clifford R. Frohmberg on Apr. 15, 1975, for a "Compensating Positioning System." A system for obtaining controlled movements of the head 20 relative to the stator 10 is disclosed and claimed in U.S. Pat. No. 4,009,428 issued to Bruce A. Sawyer on Feb. 22, 1977, for a "Control System For Magnetic Positioning Device." As will be appreciated from these patents, a polyphase relationship may be established between the poles on the head and the magnetizable zones on the stator, and this polyphase relationship may be facilitated by the windings on the head and the phase interrelationship of the signals for exciting the winding.

As a practical matter, the displacement of the head 20 toward the right in FIG. 2 relative to the stator 10 should be identical to the displacement of the head relative to the stator toward the left in FIG. 2. However, careful and extensive tests have shown that this is not so. This may be seen from representative test results such as shown in FIG. 5. In FIG. 5, displacement of the head 20 relative to the stator 10 is shown along the abscissa. Errors in the actual displacement of the head 20 relative to the desired displacement of the head 20 in the particular direction at each such instant are shown along the ordinate in FIG. 5.

As will be seen in FIG. 5, two curves 66 and 68 are shown. The curve 66 represents the errors in the actual displacement of the head 20 in the particular direction relative to the desired displacement of the head in that direction when the head is moving toward the right in FIG. 2. The curve 68 represents the errors in the actual displacement of the head 20 in the particular direction relative to the desired displacement of the head in that direction when the head is moving toward the left in FIG. 2.

The errors in the actual displacement of the head 20 at each position in the particular direction should be independent of the direction in which the head is moving relative to the stator. In other words, the curves 66 and 68 should be identical. Actually, as will be seen, the curves 66 and 68 are displaced from each other. This displacement is believed to result from hysteresis effects in the head 20 and the stator 10. These hysteresis effects result from residual magentism in the head 20 and the stator 10.

This invention includes improvements for minimizing the hysteresis effects in the head 20 and the stator 10. In one embodiment, the hysteresis effects are minimized by introducing to the windings 60 and 62 alternating signals having a relatively high frequency and a decaying amplitude. The frequency of such a signal is preferably significantly higher than the frequency of the signals introduced to the windings 60 and 62 to produce a movement of the head in the particular direction. Such a signal tends to eliminate any residual magnetism in the magnetizable zones on the head 20 and the stator 10.

Apparatus for producing the signal of relatively high frequency and decaying amplitude is shown in block form in FIG. 3. As shown in FIG. 3, the apparatus for compensating for hysteresis effects may include a subsystem 70 for controlling the acceleration, velocity and displacement of the head 20 relative to the stator 10 at each instant. Such subsystem may be constructed in accordance with the disclosures in the patents made of record above.

The signals from the subsystem 70 are introduced to a pair of programmable read only memories (PROM) 72 and 74. The memory 72 is constructed to provide a modified sine signal and the memory 74 is constructed to provide a modified cosine signal. The signals from the memories 72 and 74 are respectively introduced to digital-to-analog converters 76 and 78. The converters convert the digital information in the memories 72 and 74 into corresponding analog signals having a periodic relationship such as sinusoidal characteristics. The converters 76 and 78 may be constructed in a manner similar to that disclosed in detail in the patents specified above.

The signals from the converters 76 and 78 are respectively introduced to adders 80 and 82. The adders 80 and 82 also receive signals from a signal generator 88, which is enabled by the subsystem 70 at the end of each discrete movement of the head 20 relative to the stator 10 along a particular axis, such as the X-axis, to generate the signals of decaying amplitude. The signals from the adders 80 and 82 are respectively introduced to current drivers 84 and 86. The drivers 84 and 86 may constitute amplifiers which are constructed to respectively introduce the signals to the windings 60 and 62 in FIG. 2 in a form for producing an efficient operation of the motor defined by the head 20 and the stator 10. The adders 80 and 82 and the drivers 84 and 86 may be constructed in a manner similar to that disclosed in detail in the patents specified above.

As previously described, errors in the positioning of the head 20 may result at each instant from inaccuracies in various parameters in the motor constituting this invention. For example, the machining of various magnetic and non-magnetic zones on the stator 10 and the head 20 may not be precise. Furthermore, imperfections may exist in the magnetizable material on the stator 10 or the head 20. The distance between the various poles in the head 20 may be slightly different from the precise distances desired. Non-linearities may also result from saturation effects in the magnetic circuit.

The non-linearities such as those discussed in the previous paragraph cause the displacement of the head 20 relative to the stator 10 at each instant in the particular direction to be slightly different from the desired displacement at that instant. It has been found that such discrepancies can be accurately measured and that such discrepancies are repetitive in the sense that the discrepancies for each individual position remain the same in different tests of the motor. Such discrepancies have been found to be as high as approximatey two (2.0) mils when the widths of the magnetizable zones 12 and the non-magnetizable zones 14 in the stator 10 are forty (40) mils.

The discrepencies in the positioning of the head 20 relative to the stator 10 can be determined by sensors such as those disclosed in U.S. Pat. No. 3,836,835 issued to Bruce A. Sawyer on Sept. 17, 1974, for a "Multi Axes Linear Movement Positioning System." Alternatively, the position of the head 20 relative to the stator 10 in the particular direction at each instant may be determined by the operation of a laser interferometer or by other types of measuring devices.

The errors in the positioning of the head 20 relative to the stator 10 along the X-axis are programmed into the programmable read-only memories 72 and 74. Thus, as the head 10 is moved relative to the stator 10 along the X-axis under the control of the sub-system 70, signals are introduced to the memories 72 and 74. The memories 72 and 74 provide individual corrections to these signals at each instant in accordance with the positioning of the head 20 relative to the stator 10 along the X-axis at that instant. Such corrections may constitute changes in the sine waves which are applied to the windings 60 and 62. Such corrections represent such discrepancies as result from imprecise machining of the magnetic and non-magnetic zones on the head 20 and the stator 10 and from imperfections in the magnetizable material on the head and the stator.

At the time that the head 20 is approaching the end of each incremental movement, the subsystem 70 introduces a signal to the generator 88. The generator 88 then operates to produce signals having a relatively high frequency and having a decaying amplitude. For example, the generator may produce signals having a frequency in the range of several kilocycles and having an amplitude decaying over a particular number of cycles such as ten (10) cycles to a relatively low amplitude.

When the generator 88 produces the signals having the relatively high frequency and the decaying amplitude, such signals are introduced to the windings 60 and 62. The windings 60 and 62 accordingly act magnetically upon the pole pieces 26, 32, 44 and 50 to obtain the production of magnetic flux at the frequency of the signals in the generator 88. Since this magnetic flux decays in magnitude, any residual magnetism in the pole pieces 26, 32, 44 and 50 and in the associated poles, other than the magnetic flux produced by the permanent magnets 34 and 52, tends to become eliminated or at least minimized. The magnetic flux in the magnetizable zones in the stator 10 also tend to become eliminated, or at least minimized, in a corresponding manner. As a result, any tendency of the curves 66 and 68 to diverge becomes minimized. This causes the positioning of the moveble member in opposite vectors in the particular direction to be substantially identical when the movable member is commanded to reach such identical positions for opposite vectorial movements in the particular direction.

As will be appreciated, the system shown in FIG. 3 and described above is for one axis (such as X-axis) only. A similar system can be provided to correct the discrepancies in the positioning of the head 20 relative to the stator 10 along the other axis, such as the Y-axis.

Apparatus is shown in FIG. 4 for measuring and recording information relating to the errors at each position of the head 20 relative to the stator 10. Such information is then recorded in the programmable read only memories 72 and 74 (FIG. 3) for the X-axis and to corresponding programmable read only memories for the Y-axis.

The apparatus shown in FIG. 4 includes a data processing system 100, the operation of which is controlled from an operator console 102. The signals from the data processing sytem 100 are introduced to the digital-to-analog converters 76 and 78 for the X-axis. The converters 76 and 78 are associated with the adders 80 and 82 and the current drivers 84 and 86 also shown in FIG. 4. Digital-to-analog converters 104 and 106, adders 108 and 110 and current drivers 112 and 114 are respectively provided for the Y-axis corresponding to the converters 76 and 78, the adders 80 and 82 and the drivers 84 and 86 for the X-axis.

Apparatus may be provided to measure the error in the positioning of the head 20 relative to the stator 10 for each individual position relative to the stator along each of of the X-axis and the Y-axis. The apparatus may include an interferometer 120 for determining the positioning of the head relative to the stator along the X-axis and an interferometer 122 for determining the positioning of the head relative to the stator along the Y-axis. The interferometers 120 and 122 may be constructed in a conventional manner and may be purchased as standard commercial hardware from the Hewlett-Packard Company of Palo Alto, Calif.

The data processing system 100 controls the positioning of the head 20 relative to the stator 10 along the X-axis in accordance with the operation of the converters 76 and 78, the adders 80 and 82 and the drivers 84 and 86 and along the Y-axis in accordance with the operation of the converters 104 and 106, the adders 108 and 110 and the drivers 112 and 114. The interferometers 120 and 122 then respectively measure the actual positioning of the head 20 relative to the stator 10 along the X-axis and the Y-axis.

The signals from the interferometers 120 and 122 are introduced to the data processing system 100 and are compared with the signals produced in the system 100 to represent the desired positioning of the head relative to the stator at each instant. Any difference is introduced to a programmer 124 for the read-only memories 72 and 74 in FIG. 3. The memories 72 and 74 are then programmed to provide a correction at each position along the X-axis in accordance with the error determined for that position by the system 100 in FIG. 4. Similar corrections may be provided in corresponding memories for each position along the Y-axis.

The improvements in this invention accordingly provide for corrections in the positioning of the head 20 relative to the stator 10 to assure that the actual positioning of the head in particular directions corresponds at each instant to the desired positioning of the head in such particular directions at that instant. Such corrections tend to overcome discrepancies inherent in the operation of the motor or individual to the construction of such motor. Such corrections also tend to overcome hysteresis effects. Such corrections are provided without affecting the speed of the motor or without unduly complicating the construction of the motor.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In combination,
   a movable member,
   a stationary member constructed to define a grid having magnetizable and non-magnetizable areas alternately disposed on an incremental basis in a particular direction,
   first means disposed on the movable member and cooperative with the magnetizable and non-magnetizable areas for producing a movement of the movable member relative to the stationary member in the particular direction on an incremental basis, and
   second means responsive to each movement of the movable member relative to the stationary member on the incremental basis for introducing to the first means an alternating signal having a relatively high frequency and a decaying amplitude to minimize errors from hysteresis effects on the movement of the movable member relative to the stationary member.

2. The combination set forth in claim 1 wherein
   the second means is operative in the vicinity of the end of each incremental movement of the movable member relative to the stationary member in the particular direction to introduce the alternating signal to the first means.

3. The combination set forth in claim 1 wherein
   the movable member defines a grid having magnetizable and non-magnetizable zones alternately disposed on an incremental basis in the particular direction in a manner similar to the magnetizable and non-magnetizable zones on the stationary member.

4. The combination set forth in claim 3 wherein the first means include pairs of magnetic poles disposed in contiguous relationship to the zones on the stationary member and in a particular phase relationship to the magnetizable and non-magnetizable zones on the stationary member and wherein the first means further include means for producing magnetic flux of a first polarity in one of the poles in each pair and magnetic flux of an opposite polarity in the other pole in each pair and the first means further includes a pair of windings each associated with a different pair of poles for varying the magnetic flux in a particular relationship to produce a movement of the movable member relative to the stationary member in the particular direction in accordance with such variations and wherein the second means introduce the alternating signals of high frequency and decaying amplitude to the windings in the first means.

5. The combination set forth in claim 4 wherein the magnetizable and non-magnetizable zones in the first means and in the second means have equal widths in the particular direction and wherein the poles in each pair are displaced from each other by an effective distance equal to the width of each zone and are displaced from the poles in the other pair by an effective distance equal to one half of the width of each zone and wherein the first means include means for providing a pair of alternating signals having a relatively low frequency and having a phase relationship of 90° to each other and further include means for introducing each of the alternating signals in the pair to an individual one of the windings to obtain a controlled movement of the first member relative to the second member in the particular direction.

6. In combination, a movable member having a plurality of spaced poles each defining a grid of equally spaced magnetizable and non-magnetizable zones in a particular direction, a stationary member disposed in contiguous relationship to the movable member and having a grid of equally spaced magnetizable and non-magnetizable zones in the particular direction corresponding to the magnetizable and non-magnetizable zones on the movable member, the spaced poles on the movable member being disposed in pairs, each pole in the pair being displaced by an effective distance equal to the width of each zone and the poles in each pair being displaced from the poles in the other pair by a distance equal to one-half of the width of each zone, a pair of windings each associated with the poles in a particular one of the pairs, means associated with the poles in each pair for producing fluxes of opposite polarities in each pole in each pair relative to the other pole in the pair, memory means for indicating changes to be made in the disposition of the movable member relative to the stationary member at each position in the particular direction to correct for inaccuracies of particular parameters in the movable and stationary members, first means associated with the pair of windings for introducing alternating signals to each winding in a phase relationship of 90° relative to the phase in the other winding and having the phase in one of the signals leading or lagging the phase in the other signal in accordance with the vector of movement of the movable member relative to the stationary member in the particular direction, and second means associated with the pair of windings and responsive to the signals from the memory means in each position of the movable member relative to the stationary member in the particular direction for introducing to each winding a signal representing a correction in the position of the movable member relative to the stationary member at each instant in accordance with the position of the movable member relative to the stationary member in the particular direction at that instant to correct for inaccuracies in the particular parameters of the movable and stationary members.

7. The combination set forth in claim 6 wherein the second means includes a read-only memory.

8. The combination set forth in claim 7 wherein the first means includes means for introducing to the windings alternating signals with characteristics to obtain movements of the movable member relative to the stationary member on an incremental basis and wherein third means are associated with the pair of windings for introducing signals to the windings to compensate for hysteresis effects in the magnetizable zones in the first and second members.

9. In combination, a movable member having a plurality of spaced poles each defining a grid of equally spaced magnetizable and non-magnetizable zones in a particular direction, a stationary member disposed in contiguous relationship to the movable member and having a grid of equally spaced magnetizable and non-magnetizable zones in the particular direction corresponding to the magnetizable and non-magnetizable zones on the movable member, the spaced poles on the movable member being disposed in pairs, each pole in the pair being displaced by an effective distance equal to the width of each zone and the poles in each pair being displaced from the poles in the other pair by a distance equal to one half of the width of each zone, a pair of windings each associated with the poles in a particular one of the pairs, means associated with the poles in each pair for producing fluxes of opposite polarities in each pole in each pair relative to the other pole in the pair, first means associated with the pair of windings for introducing alternating signals to each winding in a phase relationship of 90° relative to the phase in the other winding and having the phase in one of the signals leading or lagging the phase in the other signal in accordance with the vector of movement of the movable member relative to the stationary member in the particular direction, and second means associated with the pair of windings for introducing to each winding a signal representing a correction in the position of the movable member relative to the stationary member at each instant in accordance with the disposition of the movable member relative to the stationary member in the particular direction at that instant, the first means including means for introducing to the windings alternating signals with characteristics to obtain movements of the movable member relative to the stationary member on an incremental basis and third means being associated with the pair of windings for introducing signals to the windings to compensate for hysteresis effects in the magnetizable zones in the first and second members, the first means introducing the alternating signals to the windings at a relatively low frequency and the third means introducing to the windings, near the end of each incremental movement of the movable member relative to the stationary member, signals having a relatively high frequency and having a decaying amplitude.

10. In combination, a stationary member, a movable member disposed in contiguous relationship to the stationary member and movable on a particular axis relative to the stationary member, first magnetizable and non-magnetizable zones alternately disposed on the stationary member in an equally incremental relationship along the particular axis and facing the movable member, second magnetizable and non-magnetizable zones alternately disposed on the movable member in an equally incremental relationship along the particular axis corresponding to the equally incremental relationship of the zones on the stationary member and facing the stationary member, first means associated with the movable member for producing magnetic fluxes in the magnetizable zones in the movable member and in the stationary member in a particular pattern to obtain incremental movements of the movable member relative to the stationary member on a vectorial basis along the particular axis, and second means associated with the movable member for compensating for hysteresis effects produced in the magnetizable zones in the movable and stationary members as a result of differences in the relative movements between the movable and stationary members in first and second opposite directions along the particular axis when corresponding magnetic fluxes are produced in the magnetizable zones by the first means during such relative movements in the first and second opposite directions.

11. The combination set forth in claim 10 wherein the second means produce magnetic flux of alternating polarity and of decaying magnitude in the vicinity of the end of each incremental movement of the movable member relative to the stationary member in the particular direction.

12. The combination set forth in claim 11 wherein the second magnetizable and non-magnetizable zones are disposed in paired groups and the groups in each pair are effectively displaced from each other by a distance corresponding to the width of each zone and are effectively displaced from the zones in the other group by a distance equal to one half the width of each zone.

13. The combination set forth in claim 12 wherein the first means vary the magnetic fluxes in the zones in the different groups on the movable member in an individual pattern to obtain controlled movements of the movable member relative to the stationary member in the particular direction and wherein the second means produce the magnetic fluxes in the grouped zones of the movable member with the alternating polarity and the decaying magnitude.

14. In combination, a stationary member a movable member disposed in contiguous relationship to the stationary member and movable in a particular direction relative to the stationary member, first magnetizable and non-magnetizable zones alternately disposed on the stationary member in an equally incremental relationship in the particular direction and facing the movable member, second magnetizable and non-magnetizable zones alternately disposed on the movable member in an equally incremental relationship in the particular direction corresponding to the equally incremental relationship of the zones on the stationary member and facing the stationary member, first means associated with the movable member for producing magnetic fluxes in the magnetizable zones in the movable member and in the stationary member in a particular pattern to obtain incremental movements of the movable member relative to the stationary member on a vectorial basis in the particular direction, and second means associated with the movable member for compensating for hysteresis effects in the magnetizable zones in the first and second members, means responsive to the movement of the movable member relative to the station member at each instant for indicating the position of the movable member relative to the stationary member in the particular direction at that instant, and means responsive to the disposition of the movable member relative to the stationary member in the particular direction at each instant and associated with the first means for obtaining the production by the first means of magnetic fluxes to provide corrections in the incremental movement of the movable member relative to the stationary member in the particular direction at each instant in accordance with the disposition of the movable member relative to the stationary member in the particular direction at that instant.

15. The combination set forth in claim 11 wherein means are responsive to the movement of the movable member relative to the stationary member in the particular direction at each instant for determining the position of the movable member relative to the stationary member at that instant and wherein memory means are responsive to the determination of the position of the movable member relative to the stationary member at each instant for obtaining the production by the first means of a variable amount of magnetic flux dependent upon the positioning of the movable member relative to the stationary member in the particular direction at that instant to compensate for discrepancies in characteristics of the magnetizable and non-magnetizable zones on the movable and stationary members from a particular repetitive pattern.

16. In combination, a stationary member, a movable member disposed in contiguous relationship to the stationary member and movable in a particular direction relative to the stationary member, first magnetizable and non-magnetizable zones alternately disposed on the stationary member in an equally incremental relationship in the particular direction and facing the movable member, second magnetizable and non-magnetizable zones alternately disposed on the movable member in an equally incremental relationship in the particular direction corresponding to the equally incremental relationship of the zones on the stationary member and facing the stationary member, the first means associated with the movable member for producing magnetic fluxes in the magnetizable zones in the movable member and in the stationary member in a particular pattern to obtain incremental movements of the movable member relative to the stationary member on a vectorial basis in the particular direction, second means responsive to the movement of the movable member relative to the stationary member in the particular direction at each instant for determining the position of the movable member relative to the stationary member at that instant, memory means for providing for the production by the first means of a variable amount of magnetic flux dependent upon the disposition of the movable member relative to the stationary member in the particular direction, and third means operatively coupled to the second means and the memory means for obtaining the production by the first means of a variable amount of flux at each instant in accordance with the disposition of the movable member relative to the stationary member in the particular direction at that instant and in accordance with the operation of the memory means to compensate for discrepancies in the characteristics of the magnetizable and non-magnetizable zones on the movable and stationary member from a particular repetitive pattern.

17. The combination set forth in claim 16, including, the memory means constituting a read-only memory digitally programmed to compensate for discrepancies from a repetitive pattern of the movable member relative to the stationary member in the particular direction.

18. The combination set forth in claim 16, including, means associated with the first means for obtaining the production of magnetic flux by the first means near the end of each incremental movement of the movable member relative to the stationary member to minimize hysteresis effects in the magnetizable zones of the movable and stationary members.

19. The combination set forth in claim 17, including, fourth means associated with the first means and responsive to each incremental movement of the movable means relative to the stationary means in the particular direction for producing magnetic flux alternating in polarity at a relatively high frequency near the end of each such incremental movement and having a decaying amplitude.

20. The combination set forth in claim 19 wherein the first means includes a plurality of poles disposed in pairs having a particular phase displacement relative to one another and further includes windings associated with the poles for producing in the poles magnetic flux variable periodically in a pattern to provide a controlled movement of the movable member relative to the stationary member in the particular direction in accordance with such variations and wherein the first means further includes means associated with the windings for producing variations in the magnetic flux in the poles to obtain the incremental movements of the movable member relative to the stationary member on a vectorial basis in the particular direction and wherein the fourth means is operative near the end of each incremental movement of the movable member relative to the stationary member for introducing alternating signals of the relatively high frequency and decaying amplitude to the windings to minimize hysteresis effects in the magnetizable zones.

* * * * *